Dec. 25, 1934. O. U. ZERK 1,985,708
SHACKLE MECHANISM
Filed Aug. 2, 1932
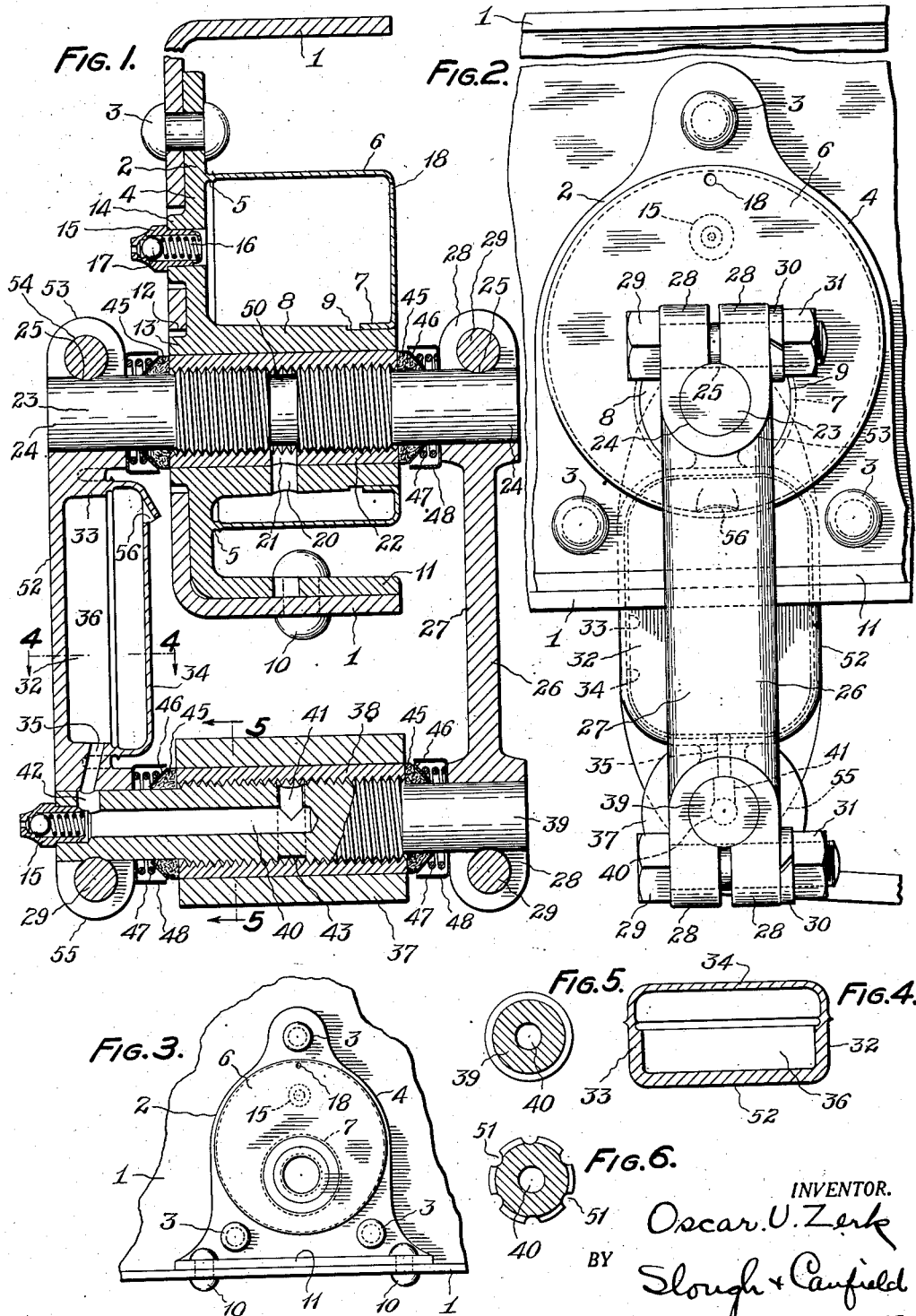
INVENTOR.
Oscar U. Zerk
BY
Slough & Canfield
ATTORNEYS Patented Dec. 25, 1934

1,985,708

UNITED STATES PATENT OFFICE 1,985,708

SHACKLE MECHANISM

Oscar U. Zerk, Chicago, Ill.

Application August 2, 1932, Serial No. 627,263

8 Claims. (Cl. 267—54)

This invention relates to shackle mechanisms for connecting the body of a vehicle with the springs or other suspension means therefor.

Heretofore, shackle mechanisms have been provided with various types of lubricating means, the lubricating means being periodically resupplied with lubricant after each operation of the vehicle for predetermined mileage such as 500 or 1000 miles. This was necessary inasmuch as the lubricant would continuously seep from the shackle mechanism during operation of the vehicle. Such periodic rechargings of the lubricant entailed inconvenience and relatively great expense.

It is an object of my invention to provide an improved shackle bearing mechanism for vehicles or the like.

It is another object of my invention to provide a shackle bearing mechanism for vehicles and the like, having improved means for effectively sealing the bearing portion thereof against the ingress of foreign abrasive substances thereto.

Another object is to provide a shackle mechanism for vehicles and the like having improved means to retain in the bearing portion thereof an initial supply of bearing lubricant.

Another object is to provide a shackle bearing mechanism having means for retaining initially applied lubricant in the bearing portion of the mechanism throughout the life of the mechanism or of the vehicle upon which it is employed.

Another object is to provide an improved shackle mechanism for vehicles and the like which is susceptible of manufacture by relatively inexpensive screw-machine and stamping operations.

Another object is to provide an improved shackle mechanism for vehicles and the like which may be easily and efficiently assembled.

Another object is to provide a shackle mechanism for vehicles and the like wherein lateral movement due to side sway or the like of the vehicle is relatively restrained in an improved manner.

These and other objects of the invention will become increasingly apparent from a consideration of the following description and drawing disclosing a preferred embodiment of my invention, wherein like parts are referred to by like reference characters, wherein:

Fig. 1 is a vertical medial sectional view of a preferred embodiment of my invention;

Fig. 2 is a fragmentary side elevational view of the embodiment illustrated in Fig. 1;

Fig. 3 is a fragmentary elevational view showing the manner of attaching the shackle to a vehicle sill or the like;

Fig. 4 is a transverse sectional view taken along the lines 4—4 of Fig. 1;

Fig. 5 is a sectional view taken along the lines 5—5 of Fig. 1 showing the lower shackle bolt;

Fig. 6 is a transverse sectional view of a modified form of shackle bolt which I may employ.

Referring to the drawing, I have indicated at 1 the sill or frame of a vehicle adapted to be linked by the shackle with a spring or other suspension means, the sill having riveted thereto a hanger 2 by means of rivets 3 although any suitable means for securing the hanger to the sill may be employed such as welding.

The hanger 2 comprises a relatively vertical plate 4 having perforated ears extending therefrom whereby it is riveted to the sill 1, the inner face of the plate 4 having integral therewith an annular ring 5 to which is weldingly secured a relatively thin cup-shaped member 6 having an eccentric, preferably circular, aperture provided therein by flaring portions of the base inwardly thereby forming an annular shoulder 7. The plate 4 eccentric of the ring 5 and concentric with the annular shoulder 7 is provided with an integral hub 8 the end portion of which is faced as indicated at 9 whereby it may sealingly engage the inner wall of the annular shoulder 7 in any suitable manner such as by force-fitting, welding or the like.

The sill 1 being channel-shaped, is also secured to the hanger 2 by means of rivets 10 and engages aligned perforations provided in a lower horizontal leg of the channel and a leg 11 integral with the plate 4. The sill 1 is provided with an aperture 12 concentric with the ring 5 of the hanger 2 to accommodate an outwardly extending flange 13 concentric with the hub 8 and an outwardly extending apertured boss 14 adapted to receive a lubricant supply nipple or the like 15.

Thus, a chamber is formed comprising a portion of the inner face of the plate 4, the external surfaces of the hub 8, and the side walls and base of the cup element 6. Lubricant is adapted to be supplied to the aforesaid chamber through the nipple 15 and contained in a manner well understood, the lubricant being forced inwardly under pressure against the tension of a spring 16 to move a ball 17 and upon a cessation of the aforesaid pressure, lubricant will be retained therein by means of the ball 17.

A vent hole as indicated at 18 is preferably provided whereby air which might otherwise be trapped within the chamber is expelled as the chamber is filled with lubricant.

The hub 8 prior to securing the cup element 6 thereto is provided with a downwardly and radially extending aperture 20 adapted to align with a similar perforation 21 provided in an internally threaded bushing 22 which is press-fitted within the hub 8, the bushing 22 preferably being of the same length as the hub 8.

The bushing 22 has threaded therein an upper shackle bolt 23, the end and central portions of which are of a diameter substantially equal to or slightly less than the root diameter of the threaded portion. The end portions of the upper shackle bolt, 24—24, are provided with spaced transverse arcuate grooves as indicated at 25 for a purpose to be later described.

An inner shackle link 26, generally rectangular in form and comprising a solid intermediate arm 27 and similar oppositely disposed relatively thickened jaws 28—28, is adapted to clampingly engage the inner end of upper shackle bolt 23 and be rigidly secured thereto by means of a bolt 29, lock washer 30, and nut 31, the bolt 29 being disposed in aligned apertures provided in the jaws 28 and engaging groove 25 provided in the shackle bolt 23, whereby relative lateral and/or rotational movement will be prevented.

An outer shackle link, generally indicated at 52, comprises an upper split jaw 53 provided with an aperture adapted to receive an end 24 of the upper shackle bolt 23 and having transverse bolt apertures 54, a relatively hollow intermediate portion 32, and a lower jaw 55 generally similar to the upper jaw 53 which is adapted to clampingly engage the outer end of a lower shackle bolt 39, by means of a bolt 29, lock washer 30 and nut 31 in a manner previously described. The intermediate portion 32 comprises an inwardly extending cup portion 33 having a confrontingly disposed cup 34 secured thereto by welding or any suitable means, thus forming a hollow intermediate chamber. The aforesaid chamber communicates with the aperture provided in the lower jaw 55 by means of a duct 35 for a purpose to be later described.

As will be most clearly observed in Fig. 4, the chamber as indicated at 36 is substantially rectangular in cross-section and is adapted to serve as a lubricant reservoir, the upper portion of the chamber being preferably flanged outwardly to provide a vent for the escape of air as the chamber is being filled as indicated at 56.

A conventional spring eye or the like 37, generally tubular in form and adapted to support an end of a spring, has press-fitted therein a bushing 38, the bushing being internally threaded and substantially the width of the spring eye.

The lower shackle bolt 39, threaded centrally thereof for a distance substantially the width of the bushing 38 and having cylindrical ends of a diameter substantially equal to the root diameter of the threaded portion, threadedly engages the bore bushing 38. The lower shackle bolt 39 is provided with a coaxial bore starting at one end thereof and continuing to a point beyond the middle portion of the bolt, as indicated at 40.

The bore 40 has communicating laterally therewith a duct 41 at substantially the central portion of the shackle bolt and a duct 42 adjacent one end of the bolt. The end of the bore 40 is enlarged whereby a lubricating nipple 15 (previously described) may be secured therein in any suitable manner well known in the art. The groove 35 is so aligned with the duct 42 as to maintain the chamber 36 in communication with the bore 40 in the lower shackle bolt; and the bore 40 in turn communicates with the external surface of the shackle bolt by means of the groove 41.

As indicated at 43, the central portion of the lower shackle bolt 39 is recessed for a short distance to substantially the root diameter of the thread for a purpose to be later described.

To effectively seal the relatively movable parts of the shackle such as the upper bushing 22, lower bushing 38, and the upper and lower shackle bolts 23 and 39 respectively against the ingress of foreign material, or the seepage of lubricant therefrom, frusto-conical washers 45 composed of any suitable packing material, encircle the shackle bolt ends and abut the end faces of the aforementioned bushings. A conformingly shaped frusto-conical preferably sheet metal ring 46 engages the portions of the sealing rings 45 disposed outwardly of the bushing faces and provides a suitable bearing surface for a normally compressed spring 47. The spring 47 is preferably disposed within a sheet metal cup 48 which substantially encloses the spring 47 and abuts the inner faces of the upper and lower clamping jaws of shackle links 26 and 52. Thus, due to its frusto-conical shape and the spring pressure exerted thereagainst, the packing rings or sealing rings 45 are forced tightly against the end faces of the bushings 22 and 38 and also radially inwardly against the upper and lower shackle bolts and surfaces, providing an effective sealing medium between these elements.

The upper chamber surrounding the hub 8 which is relatively large, may be filled with lubricant through the medium of the nipple 15 and this lubricant will be forced upwardly to the duct 20, duct 21, bushing 22, to a recessed portion 50 provided in the upper shackle bolt 23 whereby it will be carried intermediate the threads of the upper shackle bolt and the bushing. Thus, since any relative movement between the rigidly supported hanger 2 and the spring eye must take place through the only movable parts, namely the shackle bolts relative to the supporting bushing, the internal threaded wall of the bushing 22, and the upper shackle bolt will be effectively lubricated. The packing rings 45 in spring-pressed relation at each end of the bushings 22 ensure that a negligible amount of lubricant if any will escape from the bushing even over relatively long periods. Thus, a supply of lubricant may be disposed within the aforementioned chamber sufficient to lubricate the upper shackle bolt during the entire life of the shackle or the vehicle upon which employed without requiring refilling of the chamber.

Inasmuch as the upper shackle link 23 is moving continuously backwardly and forwardly within the enclosing bushing 22 during operation of the vehicle, the distribution of lubricant throughout the threaded surface of the shackle link is ensured. In the same manner lubricant is supplied to the chamber 36 through the nipple 15 disposed in one end of the lower shackle bolt 39 and by gravity communicates through the medium of the duct 35, bore 40 and duct 41 to the band or depression 43 provided in the lower shackle link, whereby in a manner previously described it is carried to the threaded surface of the shackle link to provide lubrication and is effectively sealed therein as previously described by packing or sealing rings 45. Thus a supply of lubricant which will last throughout the entire life of the vehicle or shackle is supplied individually for the upper and lower shackle bolts with attendant advantages of such a construction.

The shackle construction as described, being susceptible of relatively inexpensive stamping and screw-machine operations and easily and efficiently assembled, provides a continuously lubricated, rugged, although inexpensive shackle.

In Fig. 6 I have illustrated a modified type of shackle bolt which is generally similar to the lower shackle bolt previously described, but is provided with a plurality of longitudinally extending grooves as indicated at 51, whereby the lubricant may be more effectively carried to the relatively movable surfaces of the shackle bolts and the enclosing bushing. These grooves are preferably slightly deeper than the root of the threads but preferably do not extend below the diameter of the cylindrical portions surrounded by the packing rings, nor extend longitudinally into these cylindrical portions. The grooves also function as settling or collecting chambers to collect particles of abrasive material which may wear off of the threads or foreign material which may in any manner find ingress thereto. Although this construction as shown is primarily applied to the lower shackle bolt, it is understood that it is equally applicable to the upper shackle bolt.

Although I have shown and described preferred embodiments of my invention, it is understood that numerous and extensive departures may be made therefrom without departing from the spirit of the invention and scope of the appended claims.

Having thus described my invention, what I claim is:

1. In a spring shackle, the combination with the eye at the end of a vehicle spring, of a hanger adapted to be secured to the vehicle frame having an internally threaded integral hub and a lubricant casing associated therewith, a shackle bolt having cylindrical ends and a central reduced portion and relatively increased intermediate threaded portions engaging the hub, the bolt end portions extending outwardly from the hub, and the hub being provided with a duct affording communication between the central reduced portion of the bolt and the casing, a pair of shackle links spaced outwardly from the hub and rigidly secured to the bolts adjacent the ends thereof, and means intermediate the shackle and the hub ends to effectively seal the bolts and hub.

2. In a shackle mechanism, a shackle bolt adapted to threadedly engage a hanger at the central portion thereof and having relatively reduced end portions, a second shackle bolt substantially parallel to and spaced from the first said bolt and adapted to threadedly engage a spring eye at substantially the central portion thereof, a shackle link having end portions adapted to constrictingly and non-rotatably engage the said bolts and an integral intermediate chambered portion, communicating means intermediate the chambered portion and the external surface of the bolt adapted to engage the spring eye, means for supplying lubricant to said chambered portion, and a vent in said chamber whereby air may be expelled.

3. In a spring shackle mechanism, the combination with the eye at the end of a vehicle spring, of a hanger adapted to be secured to the vehicle frame, a hub integral with said hanger, an internally threaded bushing press-fitted within the hub, an internally threaded bushing press-fitted within the spring eye, spaced substantially parallel shackle bolts threadedly and relatively rotatably engaging said bushings, a pair of shackle links rigidly and non-rotatably engaging the bolt ends outwardly of the hanger and spring eye, a lubricant casing adapted to lubricate the shackle bolt disposed within the hanger bushing, and a second lubricant chamber formed within one of said shackle links adapted to lubricate the shackle bolt disposed within the spring eye.

4. In a spring shackle mechanism comprising an upper and a lower shackle bolt, side links interconnecting the ends of the bolts, a spring eye encircling the intermediate portion of the lower bolt and providing means making bearing contact therewith, one of said links being hollow to provide a lubricant containing casing, a lubricant passage extending from an end portion of the lower bolt to its bearing surfaces, a passage interconnecting the lubricant casing interior in its lower portion with said passage, a lubricant receiving nipple disposed to communicate lubricant laterally into said shackle mechanism to said casing and passages, said nipple disposed adjacent the lowermost bolt, and check valve means for said nipple, whereby lubricant projected under pressure through said nipple will fill said passages and provide a reservoir supply in said casing upwardly of said lower bolt.

5. In a spring shackle mechanism comprising an upper and a lower shackle bolt, side links interconnecting the ends of the bolts, a spring eye encircling the intermediate portion of the lower bolt and providing means making bearing contact therewith, one of said links being hollow to provide a lubricant containing casing, a lubricant passage extending from an end portion of the lower bolt to its bearing surfaces, a passage interconnecting the lubricant casing interior in its lower portion with said passage, a lubricant receiving nipple disposed to communicate lubricant laterally into said shackle mechanism to said casing and passages, said nipple disposed adjacent the lowermost bolt, and check valve means for said nipple, whereby lubricant projected under pressure through said nipple will fill said passages and provide a reservoir supply in said casing upwardly of said lower bolt, said casing being apertured near its upper end whereby the upper level of lubricant in the casing will be maintained at atmospheric pressure.

6. In a spring shackle mechanism comprising an upper and a lower shackle bolt, side links interconnecting the ends of the bolts, a spring eye encircling the intermediate portion of the lower bolt and providing means making bearing contact therewith, one of said links being hollow to provide a lubricant containing casing, a lubricant passage extending from an end portion of the lower bolt to its bearing surfaces, a passage interconnecting the lubricant casing interior in its lower portion with said passage, a lubricant receiving nipple disposed to communicate lubricant laterally into said shackle mechanism to said casing and passages, said nipple disposed adjacent the lowermost bolt, and check valve means for said nipple, whereby lubricant projected under pressure through said nipple will fill said passages and provide a reservoir supply in said casing upwardly of said lower bolt, said casing being apertured near its upper end whereby the upper level of lubricant in the casing will be maintained at atmospheric pressure, said first link being formed intermediately of channeled construction, and a cup shaped extension for said channeled intermediate portion extending laterally inwardly and integrally secured to the channeled portion by abutting edges of said cup shaped portion.

7. In a spring shackle mechanism comprising an upper and a lower shackle bolt, side links interconnecting the ends of the bolts, a spring eye encircling the intermediate portion of the lower bolt and providing means making bearing contact therewith, one of said links being hollow to provide a lubricant containing casing, said bolt being of tubular form through at least a portion of its length extending from an end portion to a middle portion and having a lateral wall of said tubular portion pierced at about the middle of said bolt to provide lubricant passage extending from an end portion of the lower bolt to the bearing surfaces disposed at the longitudinal middle portion of said bolt and bushing, a passage interconnecting the lubricant casing interior in its lower portion with said passage, a lubricant receiving nipple disposed to communicate lubricant laterally into said shackle mechanism to said casing and passages, said link extending upwardly of the tubular end of said bolt and lubricant provided in said casing being supplied through said interconnecting passage and said tubular bolt to the bearing surfaces thereof during use of the mechanism, and resiliently compressed lubricant sealing packing making sealing contact with the ends of said bushing and outer surfaces of said bolt to restrain loss of lubricant from the bearing surfaces.

8. In a spring shackle, the combination with the eye at the end of a vehicle spring, of a hanger adapted to be secured to the vehicle frame having an interiorly disposed integral hub and a lubricant casing providing a generally annular lubricant chamber surrounding said hub and having a major portion of said chamber disposed above the axis of said hub, a shackle bolt having cylindrical ends and a central reduced portion and relatively increased intermediate threaded portions engaging the hub, the bolt end portions extending outwardly from the hub, and the hub being provided with a duct affording communication between the central reduced portion of the bolt and the casing, a pair of shackle links spaced outwardly from the hub and rigidly secured to the bolts adjacent the ends thereof, and means intermediate the shackle and the hub ends to effectively seal the bolts and hub.

OSCAR U. ZERK.